Jan. 22, 1935.　　　J. D. BEEBE　　　1,988,435
LINEMAN'S PROTECTIVE DEVICE
Filed Oct. 1, 1931
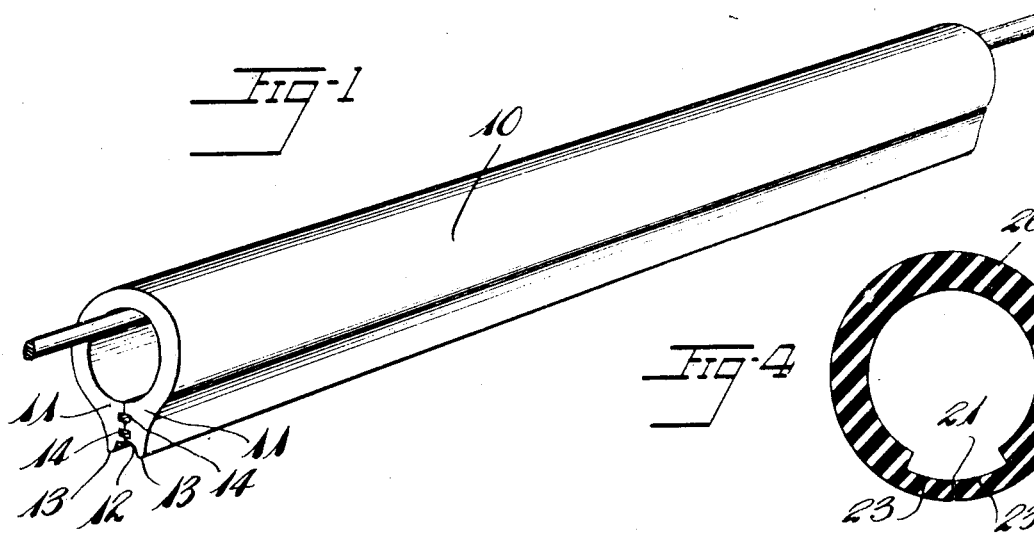
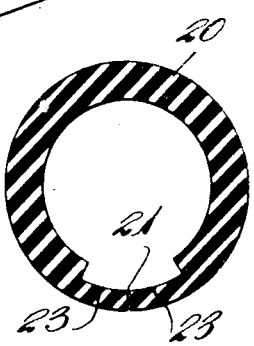
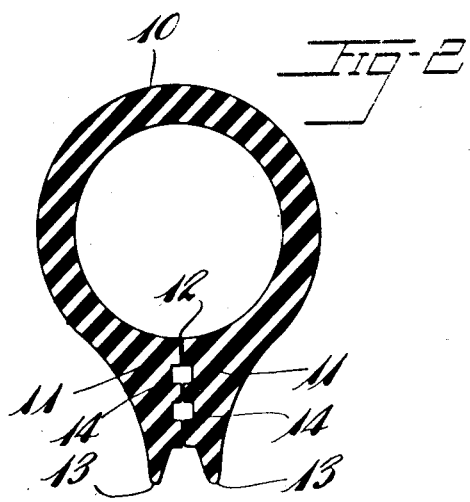
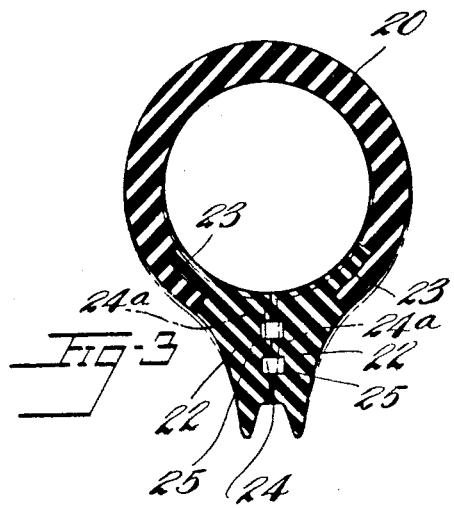

Patented Jan. 22, 1935

1,988,435

UNITED STATES PATENT OFFICE 1,988,435

LINEMAN'S PROTECTIVE DEVICE

John D. Beebe, Akron, Ohio, assignor to The B. F. Goodrich Company, New York, N. Y., a corporation of New York Application October 1, 1931, Serial No. 566,295

2 Claims. (Cl. 173—28)

This invention relates to lineman's protective devices, particularly insulating sleeves, such as are used for protecting linemen from electrical conductors.

The chief objects of the invention are to provide for effective protection of the lineman against electrical shock, with simplicity in the application and removal of the protective device, to prevent dangerous migration of water into the device, and to provide simplified procedure for attaining these objects.

These and further objects will be apparent from the following description, reference being had to the accompanying drawing, in which:

Fig. 1 is a perspective view of a portion of a conductor having mounted thereon a protective sleeve embodying the invention in its preferred form.

Fig. 2 is a view in cross-section of the sleeve of Fig. 1.

Fig. 3 is a view in cross-section of a modified form of sleeve.

Fig. 4 is a view in cross-section of a part of the sleeve of Fig. 3 in a stage of manufacture.

Referring to Figs. 1 and 2 of the drawing, the sleeve of this embodiment, indicated at 10, is tubular in shape and is of flexible and resilient dielectric material, preferably rubber composition. At its lower portion the sleeve is preferably thickened, as at 11, 11, to provide a predominance of weight in this half of the sleeve for causing this portion to hang lowermost when the sleeve is mounted upon a conductor, as shown in Fig. 1. The sleeve is formed at its thickened portion with a longitudinal slit 12 extending through the sleeve wall for mounting the device upon and removing it from a conductor, and the sleeve is preferably formed with a pair of downwardly projecting lips 13, 13, which define between them a tapering walled entrance to the slit 12 to facilitate mounting of the sleeve. These lips serve also to facilitate removal of water on the sleeve by dripping of the water therefrom.

The slit 12 may, according to the invention, be substantially non-devious between the sleeve walls to facilitate easy and quick mounting and removal, and for preventing water from creeping through the slit from below by surface migration, capillary attraction, or otherwise, and for interrupting capillary attraction between the wall surfaces of the slit, these wall surfaces are formed with longitudinally extending grooves or recesses 14, 14.

Preferably, the sleeve is so constructed that by the resilience of portions of its material the wall surfaces of the slit are caused not only to be held in contact but also to be resiliently pressed against each other, thereby effecting a further safeguard against creeping of water into the interior of the sleeve and assuring complete enclosure of the conductor by the insulating rubber. This may be effected by vulcanizing the rubber with a portion thereof in a relatively distorted shape so that in the final article the rubber, by its tendency to resume the shape of vulcanization, is caused to press the contacting surfaces of the slit together.

For example, referring to Figs. 3 and 4, a cylindrical body element 20 of this embodiment may be curved to the cylindrical form of Fig. 4, and after severing the tube longitudinally at 21, it may be assembled with the lower portions 22, 22 of the sleeve as shown in Fig. 3. The assembly may be conveniently effected upon a mandrel of relatively larger diameter than that of the tube of Fig. 4, and by rabbeting the mating margins of the parts, as at 23, and uniting the parts by means of a vulcanizable cement, preferably under heat and pressure, a strong seam may be made without objectionably affecting the dielectric or the resilient properties of the sleeve. Due to the tendency of the wall portion 20 to resume the shape of its original, smaller diameter, the portions 22 are pressed together resiliently along the wall surfaces of the mounting slit indicated at 24. Preferably the final relationship of the portions 22 and the body 20 is such that in allowing the sleeve to close about the conductor the portions 22 will first contact near their outer margins, as shown in dotted lines in Fig. 3 and then progressively toward the body element, so that full contact will not be prevented by local pressure, as would occur if the shape were such that the first contact occurred close to the body element.

In order that the resilient force of the body 20 in pressing the portions 22 together at their bases or inner margins may not cause them to gap apart at their outer margins as a result of the pressure being applied at the other end of the slit, the said portions preferably are given concave shape in cross-section as shown at 24a, 24a, in Fig. 3, and the stiffness of the portions 22 from point to point radially of the structure is so coordinated, as by being properly graduated in thickness, with the curvature of their adjacent concave faces and with the resilient force of the body 20 as to provide, as nearly as possible, the same pressure per unit area throughout the concave contacting faces 24a, the closing of the slit in this construction being effected progressively from its lower end to its upper end.

As in the first embodiment, the adjacent surfaces may be formed with grooves, indicated at 25, 25 to facilitate manual separation of the surfaces by interrupting capillary attraction of these surfaces, these grooves serving also as a safeguard against creeping of water as has been explained heretofore.

A sleeve constructed according to the invention has the advantages of being easily and quickly mountable on and detachable from a conductor and at the same time of having provision for effectively interrupting the creeping of water through the mounting slit, which is important in securing adequate protection of the lineman against shock in wet weather.

Variations may be made without departing from the scope of the invention as it is hereinafter claimed.

What is claimed is:

1. A lineman's protective sleeve comprising juxtaposed surfaces, at least one of the same being recessed to interrupt capillary attraction of the surfaces.

2. A lineman's protective sleeve comprising juxtaposed surfaces providing a substantially non-devious mounting slit, at least one of said surfaces being recessed to interrupt capillary attraction of the surfaces.

JOHN D. BEEBE.